Jan. 6, 1959  F. W. RECKNAGEL  2,867,455
BEARING SEAL ASSEMBLY
Filed March 16, 1956

INVENTOR
FREDERICK W. RECKNAGEL
BY
Kolisch and Kolisch
ATTORNEYS

United States Patent Office 2,867,455
Patented Jan. 6, 1959

2,867,455

BEARING SEAL ASSEMBLY

Frederick W. Recknagel, Verbank, N. Y., assignor to The Federal Bearings Co., Inc., Poughkeepsie, N. Y., a corporation of New York Application March 16, 1956, Serial No. 572,092

5 Claims. (Cl. 286—5)

The present invention relates to bearings and more particularly to a bearing seal assembly adapted to seal in lubricant and keep out foreign matter. The invention is particularly applicable to bearings having relatively rotatable inner and outer cylindrical surfaces spaced apart by anti-friction elements.

Bearing seals are well known comprising a resilient annular washer of rubber-like or plastic material positioned between two annular bearing members and held or anchored rigidly along one peripheral circular edge to one of said annular members while the other peripheral edge of the washer is free and in riding and flexing engagement with a portion of the other annular member. It is important that the free end of the washer maintain as perfect a seal as possible and keep the lubricant within the bearing and keep out any foreign matter deleterious to the efficiency of the anti-friction members making up the main elements of the bearing.

While such lubricant seals have found a wide range of use, they have certain limitations. Vibration of the relatively moving surfaces, as well as lack of concentricity of the surfaces, was apt to cause non-uniform wearing of the seal at the contacting edge after prolonged use so that not all portions of the seal would maintain a snug, flexing fit with the relatively moving surface, whereby lubricant leakage would occur and/or foreign matter would enter the bearing. Even if the seal did not wear appreciably after prolonged use, it might lose enough of its resilient quality through aging to affect deleteriously its sealing properties.

The present invention overcomes to a large extent the foregoing difficulties by means of a novel bearing seal assembly which utilizes the flat surface of the resilient annular seal and not the peripheral edge as the positive contacting sealing portion. A feature of the invention resides in using an annular shield fixed between the two annular bearing members in combination with said washer, the resilient washer being maintained in positive surface contact during use with the annular shield, whereby the space defined by the inner and outer annular members is maintained substantially lubricant tight.

The assembly is utilized in combination with inner and outer annular bearing members provided with an annular groove or shelf adjacent each of their end faces. The shield comprises a stiff annular washer engaged along one of its peripheries to the annular groove of one of said members, the shield extending radially towards the other of said annular members. The resilient annular seal which is flanged about one of its peripheries by a metallic grommet is seated via said metallic flange in an annular groove of the other annular member with the flat free portion of said resilient seal extending radially towards and behind said shield in wiping and sealing engagement with the inside surface thereof. Provision may be made for maintaining the flat portion of the seal biased against the shield surface to assure sealing contact.

An advantage of the improved sealing structure is that its design insures maintaining a tight seal during use by virtue of the movement of the lubricant within the sealed bearing proper which is thrown centrifugally up against the flat surface of the resilient seal thereby further forcing it in sealing engagement against the inside surface of the annular shield.

Thus, it is an object of the invention to provide an improved bearing seal assembly capable of prolonged use without substantial loss in sealing effectiveness.

Other objects of the invention will become clear from the description when taken in conjunction with the drawing wherein.

Figure 1:
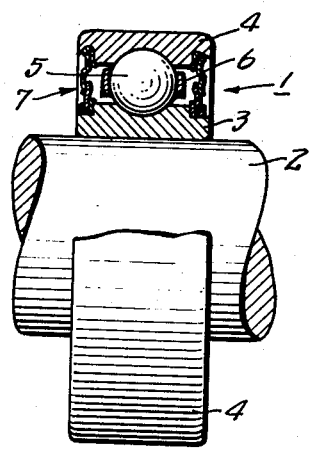
Fig. 1 is a cross-section showing an embodiment of the novel bearing seal assembly as applied to inner and outer race members of a ball bearing.
Figure 2:
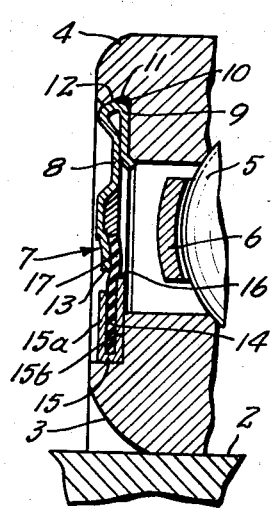
Fig. 2 is an enlarged view showing in more detail the bearing seal assembly illustrated in Fig. 1.

Referring to the drawing, Fig. 1 shows a cross section of a ball bearing indicated generally at 1 surrounding shaft 2 comprising inner and outer annular members 3 and 4, respectively, spaced apart by a complement of bearing balls 5 held together by a retainer 6. The annular chamber occupied by the balls is maintained substantially lubricant tight by bearing sealing assembly 7 shown in more detail in the enlargement of Fig. 2 as comprising annular shield 8 having a peripheral spring clip or loop portion 9 fitted peripherally into annular groove 10 of outer annular member 4, said groove being defined by shoulder 11 running transverse to the axis of rotation of the bearing and by inclined peripheral surface 12 angling downward from said shoulder. The annular shield extends radially towards inner annular member 3 and terminates at 13, the shield being preferably shaped cross-sectionally with an off-set or angular-like configuration as shown to give it rigidity and stiffness.

The resilient seal is in press-fitting engagement about its peripheral grommet portion with inner annular member 3 and may comprise a synthetic rubber washer 14 (for example, neoprene) flanged about its inner periphery with metallic grommet 15 preferably comprising short flange 15a on one side surface and long flange 15b against the other side surface of the resilient seal washer. The grommet as shown is substantially U-shape and fits into a right angled annular shelf or groove cut into an end face of inner annular bearing member 3. It will be noted that grommet flange 15b terminates at 16 which in the embodiment illustrated is just short of terminating end portion 13 of the shield. This design is preferred for the reason that on either side a substantial part of the resilient seal is backed up by either the shield or the flange of the grommet. The inside surface of the shield is in sealing contact with the working portion of the resilient seal at interface 17. In this instance the surface of the shield presses up against the seal. Annular member 3 which is press-fitted on shaft 2 rotates with the shaft which causes seal 14, which is an integral portion of inner member 3, to wipe against the shield. The rotating seal structure acts as a slinger and by such action keeps the grease in the bearing circulating and continually supplies fresh lubricant to the surfaces where it is needed. In addition, the continual swirling of the grease during rotation of the bearing helps to prevent seal leakage by raising the pressure of the lubricant against the seal which is forced into greater sealing contact with the shield.

Another advantage of the invention is that the sliding or wiping surfaces of the shield and resilient seal are continually lubricated, thereby preventing the seal from overheating. This one advantage alone helps to prolong the life of the novel seal structure.

Figure 3:
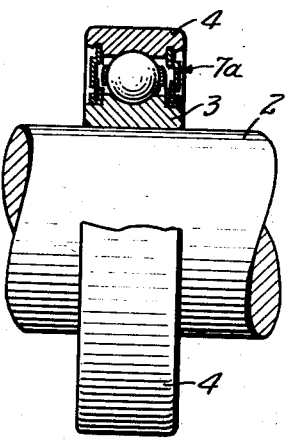
Fig. 3 is another embodiment of the bearing seal assembly provided by the invention.
Figure 4:
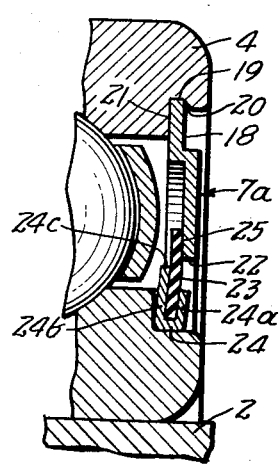
Fig. 4 is an enlarged view of the sealing embodiment of Fig. 3.
Figure 5:
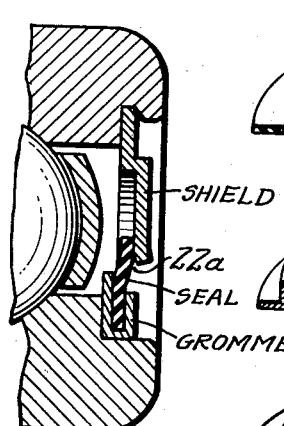
Fig. 5 is similar to Fig. 4 but differs slightly in the configuration of the resilient annular seal and grommet combination.
Figure 6A:
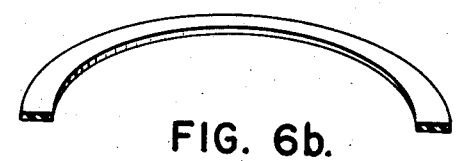
Figs. 6a to 6d show the starting materials in section used in producing the resilient seal and grommet flange.
Figure 6B:
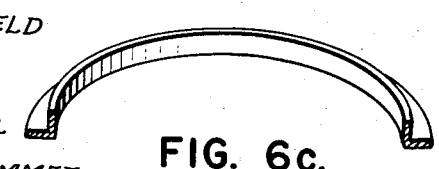
Figure 6C:
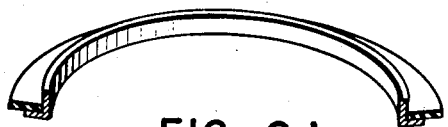
Figure 6D:
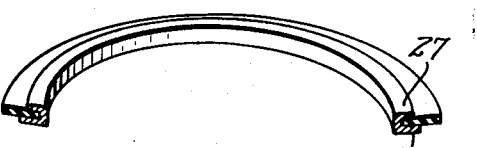

Figs. 3, 4 and 5 show other embodiments of the sealing structure. The structure indicated generally in Fig. 3 as 7a and in more detail in Fig. 4 shows annular shield 18 with its outer periphery 19 nestling in annular groove 20 of outer race member 4 and with a flat face thereof abutting shoulder 21. The shield is off-set, at right angles and terminates radially towards inner race member 3 at 22. The resilient annular seal 23 which is integral with inner race member 3 is similarly flanged about its inner periphery by a grommet 24 comprising in cross section long flange 24b on the inside and short flange 24a on the outside of the seal. Long flange 24b terminates at 24c, just short of terminating end portion 22 of the shield thus insuring adequate sealing support. It will be noted that the grommet in cross section is angled to one side, thus biasing seal 23 against shield 18 at 25. This is accomplished by cupping or dishing the grommet when flanging the seal as will be shown later. Fig. 5 is similar to Fig. 4 and shows the terminating end portion of the shield radiused at 22a and also the grommet in the normal right angled configuration, that is not dished.

Referring now to Figs. 6a to 6d, 6a shows a section of a synthetic rubber seal. 6b is an annular grommet showing in section a double flange comprising long flange 26 and short flange 27 as shown in 6d, and 6c shows the assembly of the two while 6d shows the grommet in press-fitted contact about both sides of the annular seal, the grommet being slightly dished.

Figure 7:
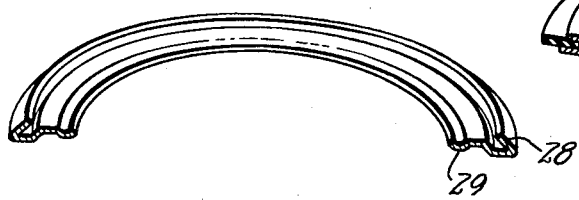
Fig. 7 is a section of an embodiment of the annular shield.

Fig. 7 shows in section an embodiment of a shield washer that can be used in carrying out the invention, the shield comprising a peripheral spring clip portion 28 and a smoothly curved seal-contacting surface portion 29.

It will be apparent from the foregoing description that the seal structures provided by the invention offer still further advantages besides those enumerated. For one thing, the seal is noise free. For another, it is not affected by vibration or lack of concentricity of the seal contacting surfaces the way prior art seals are prone to be affected. One very important further advantage is that the seal is adequately protected against damage by being wholely contained within the bearing and is covered by the outer shield. Improved results are assured if care is taken in selecting the shield material. For example, if the metallic shield is made from rolled stock or by coining or other cold working finishing operation, the resulting surface provides a smooth wiping face which minimizes wiping friction.

Summarizing the invention broadly, an improved bearing seal assembly is provided for a bearing comprising two relatively rotatable inner and outer cylindrical surfaces spaced apart substantially concentrically by a complement of antifriction elements, said assembly being comprised of a stiff annular shield washer peripherally engaged to one of said surfaces and extending radially towards but short of the other surface. Oppositely disposed from said shield is a resilient annular seal stiffened along one periphery (i. e. peripherally supported) and engaged about said stiffened periphery to the other of said surfaces, said seal extending radially towards and behind the shield with its free portion in wiping and sealing engagement with a surface portion of said shield.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. The improved bearing seal assembly as defined in claim 5 wherein the annular groove of said outer annular member engaged peripherally by said shield comprises a shoulder running transverse to the axis of rotation of said bearing and an inclined peripheral surface extending from said shoulder to the end face of said member.

2. The improved bearing seal assembly as defined in claim 1 wherein the peripheral portion of the shield engaged to the peripheral recess of said outer annular member comprises in cross section a spring-clip configuration.

3. The improved bearing seal assembly as defined in claim 2 wherein the annular shield in cross section has an off-set configuration.

4. The improved bearing seal assembly as defined in claim 5, wherein the grommet is dished outwardly of said spaced-apart annular members, one flange being parallel to the other, thereby biasing a flat portion of said seal against a wiping surface of the shield.

5. In a bearing comprising relatively rotatable inner and outer annular members spaced apart by a complement of antifriction elements, said inner and outer members each being provided adjacent their respective end faces with an annular groove, an improved bearing seal assembly comprising an annular shield rigidly engaged around one of its peripheries to the annular groove of one of said annular members, said shield extending radially towards and terminating short of the other of said annular members, a resilient and substantially flat annular seal with an annular metallic grommet flanged in the shape of a U integrally about one of its peripheries to form two side flanges extending radially along the side surfaces of the seal, the flange along the inner side of the seal being radially longer than but parallel to the flange along the outer side surface, the longer flange extending radially to approximately the terminating end portion of said shield, the peripherally flanged portion of the seal being rigidly seated in the annular groove of the other annular member, the free end portion of said resilient seal extending radially towards and behind said shield in wiping and sealing engagement with the inside surface thereof, the longer flange of the grommet adding stiffness to the seal as well as supporting the seal against the inner surface of said shield.

References Cited in the file of this patent
UNITED STATES PATENTS

| | | |
|---|---|---|
| 2,054,580 | Delaval-Crow | Sept. 15, 1930 |
| 2,144,691 | Schmal | Jan. 24, 1939 |
| 2,415,888 | Joy | Feb. 18, 1947 |
| 2,655,392 | Lighthall | Oct. 13, 1953 |
| 2,714,022 | Nelson | July 26, 1955 |